US005811001A

United States Patent [19]

Chang

[11] Patent Number: 5,811,001

[45] Date of Patent: Sep. 22, 1998

[54] WATER DISPENSING COUPLING APPARATUS OF WATER PURIFIER PIPE JOINT FOR CREATING A WATER-TIGHT SEAL IN A WATER PURIFIER

[75] Inventor: Beung-Kwon Chang, Suwon, Rep. of Korea

[73] Assignee: Samsung Electronics Co., Ltd., Suwon, Rep. of Korea

[21] Appl. No.: 774,874

[22] Filed: Dec. 27, 1996

[30] Foreign Application Priority Data

Mar. 18, 1996 [KR] Rep. of Korea .................... 1996-7250

[51] Int. Cl.[6] .................................................. B01D 35/027

[52] U.S. Cl. ......................... 210/238; 62/390; 222/146.6; 222/189.06

[58] Field of Search .................................... 222/132, 142, 222/146.1, 146.6, 189.06, 631; 62/390; 210/257.1, 232, 238

[56] References Cited

U.S. PATENT DOCUMENTS

| | | | |
|---|---|---|---|
| 552,518 | 1/1896 | Duffield | 222/146.6 |
| 3,308,636 | 3/1967 | Schaaf | 222/146.6 |
| 3,698,603 | 10/1972 | Radcliffe | 222/146.6 |
| 3,790,028 | 2/1974 | Gardner, Jr. et al. | 222/185 |
| 5,121,612 | 6/1992 | Guay et al. | 222/390 |
| 5,307,958 | 5/1994 | Burrows | 222/146.1 |
| 5,390,826 | 2/1995 | Burrows | 222/146.6 |
| 5,395,014 | 3/1995 | Burrows | 222/146.6 |

*Primary Examiner*—W. L. Walker
*Attorney, Agent, or Firm*—Burns, Doane, Swecker & Mathis, L.L.P.

[57] ABSTRACT

The present invention relates to a water dispensing coupling apparatus of a water purifier, the apparatus having a water dispensing apparatus comparing water discharge pipe formed with a female screw at one side of an inner periphery thereof and formed at a predetermined position thereof with an airtight cover unit having a tapered inclination, whereas a fastening unit connected to the water discharge pipe is formed with a male screw meshed at one side thereof to the female screw and is insertedly disposed at the other side thereof with a packing member at a predetermined spacing, whereby there is an advantage in that an water dispensing outlet of a water dispensing body can be perpendicularly faced downward and the hot water and cold water can be prevented from being leaked, so that reliability and quality of the water purifier can be improved.

4 Claims, 7 Drawing Sheets

WATER DISPENSING COUPLING APPARATUS OF WATER PURIFIER PIPE JOINT FOR CREATING A WATER-TIGHT SEAL IN A WATER PURIFIER

BACKGROUND OF THE INVENTION

1. Field of the Invention

The present invention relates to a coupling apparatus of a water purifier by which leakage of hot water and cold water can be prevented when a dispensing valve is coupled to a water discharge tube.

2. Description of the Prior Art

Typically, a hot/cold water purifier is used to separate noxious pollutant substances from fresh water such as tap water supplied from a faucet by passing same through separate filtering means for supply of purified water.

A typical water purifier of the reverse osmotic type has its body 10 covered by a front panel 11, a rear panel 12, a side panel 13, an upper panel 14 and a lower panel 15 (see FIGS. 1–3).

The front panel 11 is provided at a predetermined external mid-section thereof with guttering means 16 for collecting residual water dripping from hot/cold water dispensing valves 130 and 131 (described later) and simultaneously for draining the residual collected water automatically.

Furthermore, the body 10 is respectively/provided cross-wise at a lower and an upper side thereof with a first and a second partitioning member 20 and 21 in order to form predetermined spaces E and F, as illustrated in FIGS. 2 and 3.

Between the first partitioning member 20 and the second partitioning member 21, there is vertically disposed a third partitioning member 22 so as to form a predetermined space G, at a rear side thereof.

Between the first partitioning member 20 and the second partitioning member 21, there is crosswise disposed a fourth partitioning member 23 at a predetermined height of a front lateral side of the third partitioning member 22 in order to form respective spaces H and I at an upper front side and a lower front side thereof.

At an upper surface of the first partitioning member 20 in the space E, there is disposed a purified water storage tank 30 for storing a certain amount of purified water, and at the front panel 11 there is provided a control box 40 for selectively manipulating the water purifier.

At an upper lateral side of the lower panel 15 in the space F, there is arranged a compressor 50 for compressing refrigerant at a high temperature and at a high pressure, and at the other side thereof, there is disposed a condenser 60 for receiving the compressed refrigerant from the compressor 50 to thereby condense same, and at a mid-section thereof there is provided cooling means 70 for cooling the compressor 50 and the condenser 60.

At a predetermined height at a rear surface of the third partitioning member 22 in the space G, there are provided a plurality of filtering means 90 removably supported by first and second types of filter fixing brackets 80 and 81, and the second partitioning member 21 is provided at an upper lateral surface thereof with a pressure pump 100.

In other words, the plurality of filtering means 90 includes, as illustrated in FIG. 4, a sediment filter 91 mounted by a filter fixing bracket 80 so as to remove floating substances such as rusted dregs and the like contained in the fresh water when the fresh water supplied from a faucet (not shown) passes therethrough, a pre-process filter 92 mounted by a bracket 80 so as to remove foreign objects such as chlorine substances and the like included in the fresh water when the fresh water supplied from the sediment filter 91 passes therethrough, a first and a second membrane filters 93 each mounted by a bracket 80 so as to eliminate various heavy metals and carcinogens contained in the fresh water when the fresh water supplied from the pre-process filter 82 and pressurized by the pressure pump 100 passes therethrough, a post-process filter 95 mounted by a bracket 80 so as to eliminate odor and harmful gas components contained in the fresh water supplied simultaneously from the first and second membrane filters 93 and 94, and a sterilizing filter 96 mounted by a bracket 81 so as to sterilize harmful bacteria contained in the fresh water when the fresh water supplied from the post-process filter passes therethrough, to thereby supply same to the purified water storage 30.

The sediment filter 91, pre-process filter 92, the first and the second membrane filters 93 and 94, post-process filter 95, sterilizing filter 96 and the pressure pump 100 are inter-connected by connecting hoses 97 in order to facilitate the flow of the fresh water.

Furthermore, the bottoms of the first and the second membrane filters 93,94 are connected to a concentrated water pipe 98 so as to discharge concentrated (waste) water generated in the course of filtering the fresh water.

Meanwhile, there is disposed in the space H at an upper surface of the fourth partitioning member 23 a hot water storage tank 110 and a cold water storage tank 120 in order to respectively receive purified water from stored in the purified water storage tank 30 through first and second purified water pipes 31 and 32 at predetermined quantity, to heat and cool same.

At this time, the first purified water pipe 31 is connected at an upper end thereof to one side of a floor surface at the purified water storage tank 30 and simultaneously connected at a lower end thereof to the hot water storage tank 110.

The second purified water pipe 32 is connected at an upper end thereof to the other side of the floor surface at the purified water storage tank 30 and at the same time connected at a lower end thereof to an upper surface of the cold water storage tank 120.

Furthermore, the hot water storage tank 110 is inherently disposed with a heat member 111 for receiving an electric power to thereby generate heat and for heating the purified water stored therein.

The cold water storage tank 120 is spirally wrapped at a peripheral side thereof by a cooling coil 121 for receiving fluid refrigerant to cool the purified water stored in the cold water storage tank 120.

The hot and cold water respectively stored in the hot water storage tank 110 and the cold water storage tank 120 are respectively connected to water discharge pipes 112 and 122 disposed above the hot water storage tank 110 and the cold water storage tank 120.

The water discharge pipes 112 and 122 are respectively mounted to a hot water dispensing valve or spigot 130 and a cold water dispensing valve 131 protruding outwardly through the front panel 11.

In other words, each of the hot water and cold water dispensing valves 130 and 131 includes, as illustrated in FIGS. 5 and 6, a water dispensing body 133 inherently provided with a valve body 132 and respectively screwed to the water discharge pipe 112 of the hot water storage tank 110 or to the water discharge pipe 122 of the cold water storage tank 120 to thereby cause the hot water and cold water to be discharged to the outside. A water dispensing lid 134 is screwed onto an upper opening of the water dispensing body 133, and a dispensing lever 137 is hinged through the medium of a hinge axis 135 to an upper end of the valve body 132 so that the valve body 132 can be vertically operated to thereby open or close a water dispensing outlet 133*a* of at the water dispensing body 133.

At this time, the water dispensing lever 137 includes an operation block 136*a* formed at an upper end thereof in order to vertically move the valve body 132 upon the water dispensing lid 134 serving as a support base, when the lever is rotated backward 64*a* pushing force generated by vessels such as cups and the like to dispense water. A groove 135*b* is formed in an outer surface of the fastening portion 135 to receive a packing member 136 that becomes compressed between a shoulder 133*b* of the body 133, and an end face 113*a* of the pipe 112 or 122 to create a seal.

Meanwhile, the space (I) is disposed with a main PCB 140 (Printed Circuit Board) at an upper surface of the second partitioning member 21 so as to control operation.

When function and selection buttons (no reference numerals designated) disposed at a control box 40 provided at a front upper end of the body 10 are manipulated to thereby cause the pressure pump 100 to be operated, the fresh water supplied by water pressure of the faucet (not shown) flows through the plurality of filtering means 90 by way of pressure generated by activation of the pressure pump 100, to be purified.

In other words, the fresh water supplied from the faucet (not shown) is removed of floating substances such as rusted dregs when it passes through the sediment filter 91, and foreign objects such as chlorine components and the like contained in the fresh water are eliminated when the fresh water passes through the sediment filter 91 and the pre-process filter 92.

Various heavy metals and carcinogens contained in the fresh water are removed when it passes through the pre-process filters 82 and through the first and the second membrane filter 93 and 94.

Odor and the noxious gaseous substances contained in the fresh water are removed when the fresh water passes through the first and the second membrane filters 93 and 94 and through the post-process filter 95.

The fresh water is separated from harmful bacteria contained therein when passing through the post-process filter 95 and through the sterilizing filter, and thereafter is supplied into the purified water storage tank 30.

At this time, the purified water in the purified water storage tank 30 is respectively supplied into the hot water storage tank 110 and the cold water storage tank 120 through the first purified water pipe 31 and the second purified water pipe 32.

In other words, the purified water flowing through the first purified water pipe 31 is continuously supplied to create a full water level in the hot water storage tank 110, and the purified water flowing through the second purified water pipe 31 is continuously supplied to create a full water level in the cold water storage tank 120.

The purified water is not re-stored in the purified water storage tank 30 until the purified water in the hot water storage tank 110 and the cold water storage tank reaches the full water level to thereby prevent further supply of the purified water from the tank 30.

At the same time, when a predetermined quantity of purified is stored in the tank 30 according to a water level sensor (not shown) mounted in the purified water storage tank 30, the pressure pump 100 is stopped.

Meanwhile, when a heater member 111 disposed in the hot water storage tank 110 is activated to heat the water, the heater member 111 is caused to generate heat at an established temperature according to current applied thereto to heat the purified water stored tank in the hot water storage 110.

Furthermore, when a compressor 50 is activated to cool the water in the tank 120, high-pressurized and high-temperature refrigerant gas is conducted into the condenser 60 according to compression action of the compressor 50, and the refrigerant gas flowing in the condenser 60 is compressed by wind generated by activation of the cooling means 70.

At this time, the refrigerant gas compressed in the course of passing through the compressor 60 is changed to high-pressurized liquid refrigerant gas having a little higher temperature than room temperature which is at ambient temperature and passes through a capillary tube to thereafter be reduced in pressure.

The liquid refrigerant gas which is reduced in pressure is infused into the cooling coil 121 and is expanded, and is then gasified to low temperature and low pressure and simultaneously serves to cool the purified water contained in the cold water storage tank 120.

Meanwhile, when a user intends to dispense the hot water or cold water utensils such as cup or the like (not shown), the cup is pushed backward against the water dispensing lever 137 disposed at the hot and cold water dispensing valves 130 and 131 to open a passage of the dispensing valves 130 and 131.

The hot water or the cold water stored in the hot water storage tank 110 and the cold water storage tank 120 travel through the water discharge pipes 112 and 122 for water dispensing.

However, there is a problem in the conventional water dispensing apparatus thus constructed, in that when the dispensing body 133 is screwed into the pipe 112 or 122 far enough to compress the packing member 136 by an extent sufficient to create a proper seal, the end face 113*a* of the pipe, the water outlet 133*a* might not be pointing exactly vertically downwardly. By then reversely rotating the body 133 to direct the water outlet 133*a* downwardly, the spacing between the shoulder 133*b* and the end face 113*a* will increase, possibly relieving the compression of the packing member 136 sufficiently to produce leakage.

SUMMARY OF THE INVENTION

Accordingly, the present invention is provided to solve the aforementioned problem and it is an object of the present invention to provide a water dispensing coupling apparatus of a water purifier by which a water dispensing outlet at a water dispensing valve of the water purifier can vertically face downward and at the same time, the hot water and the cold water flowing therein cannot be leaked out.

In accordance with the object of the present invention, there is provided a water dispensing coupling apparatus of a water purifier, the apparatus comprising water discharge pipes formed with a female screw at one side of an inner periphery thereof and formed at a predetermined position thereof with an airtight cover unit having a tapered inclination, whereas a fastening unit connected to the water discharge pipe is formed with a male screw meshed at one side thereof to the female screw and is insertedly disposed at the other side thereof with a packing member at a predetermined spacing.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

The water dispensing coupling apparatus of a water purifier according to an embodiment of the present invention will be described in detail with reference to the accompanying drawings.

Figure 1:
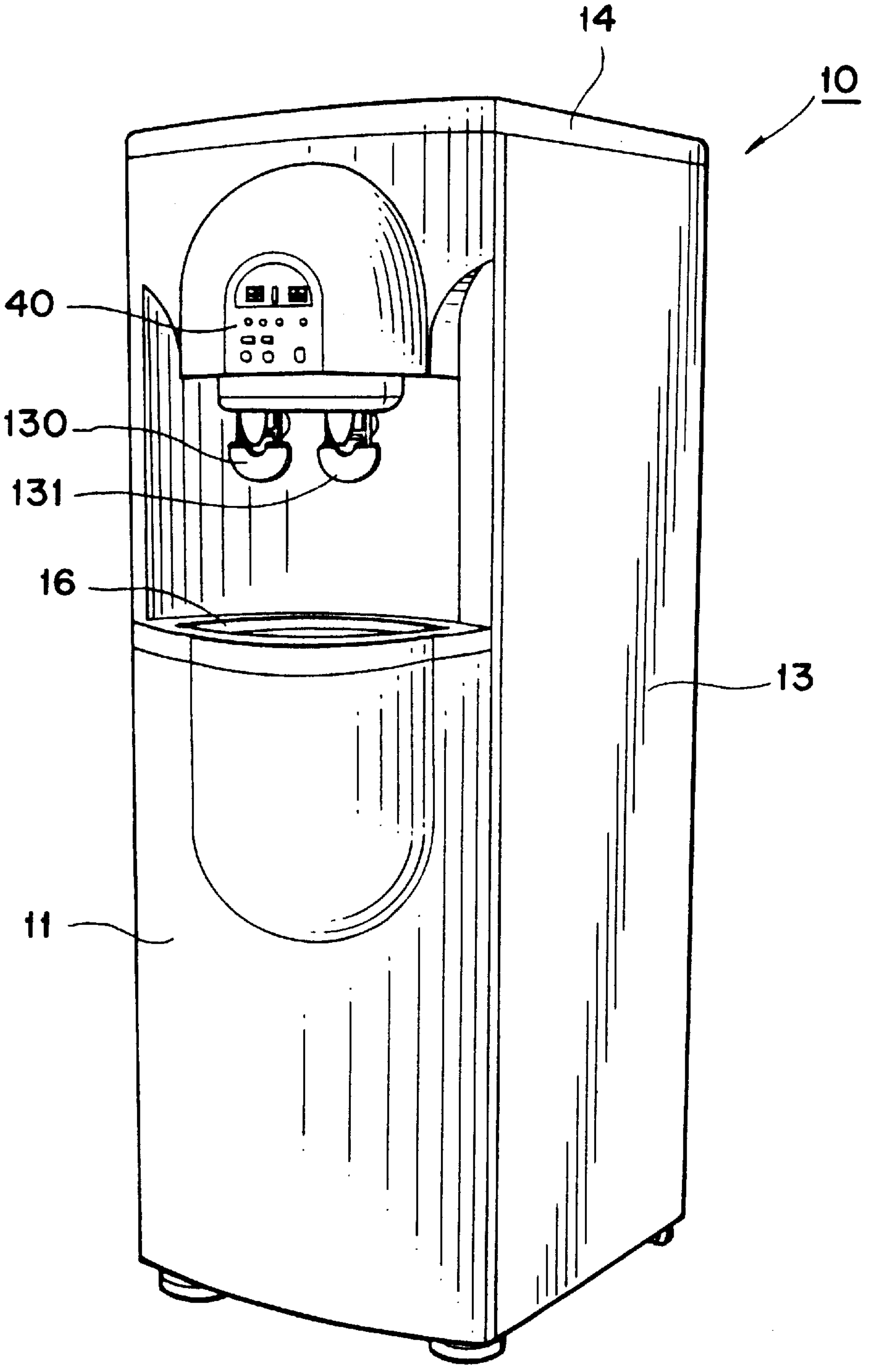
FIG. 1 (PRIOR ART)
FIG. 1 is a perspective view for illustrating a hot/cold water purifier according to the prior art.
Figure 2:
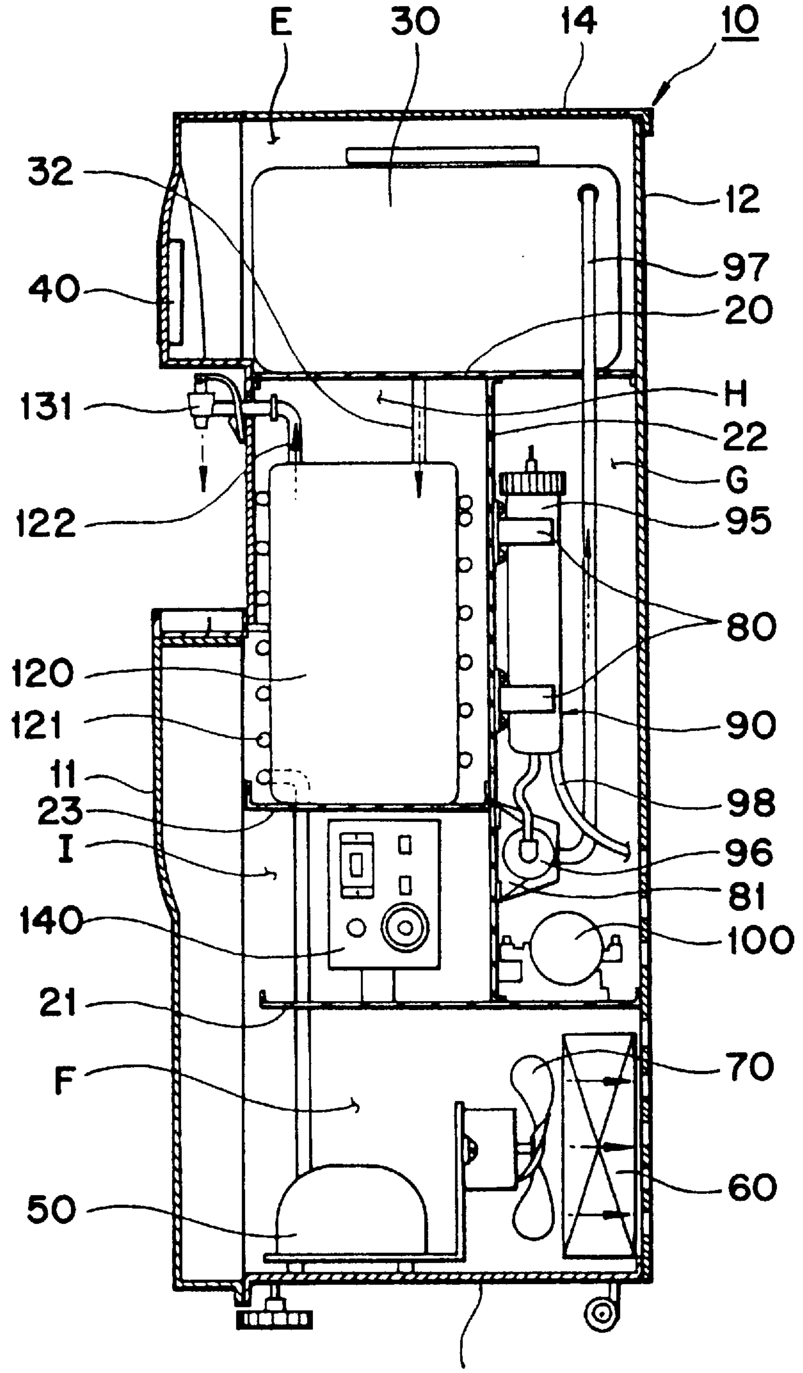
FIG. 2 (PRIOR ART)
FIG. 2 is a vertical sectional view through the hot/cold water purifier according to the prior art.
Figure 3:
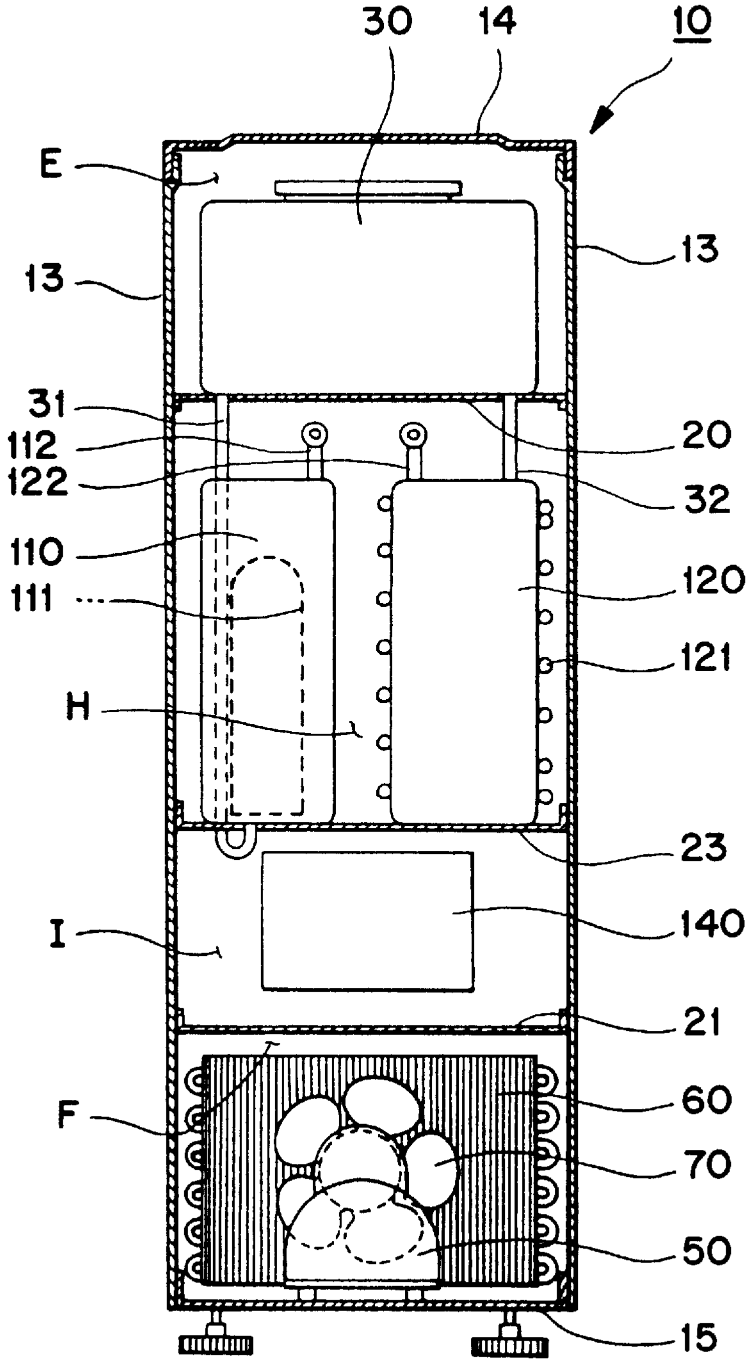
FIG. 3 (PRIOR ART)
FIG. 3 is another vertical sectional view through the hot/cold water purifier according to the prior art.
Figure 4:
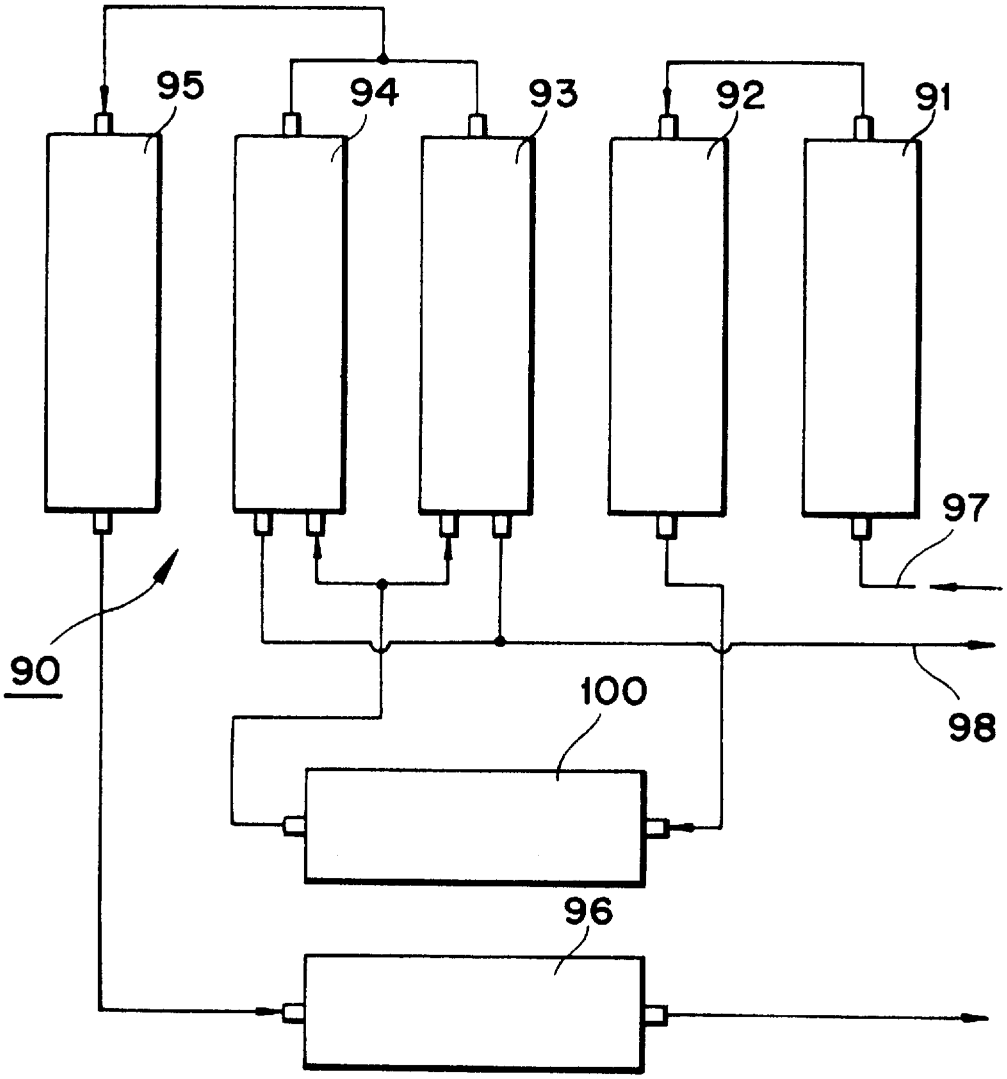
FIG. 4 (PRIOR ART)
FIG. 4 is a schematic view of filtering means and a pressure pump according to the prior art.
Figure 5:
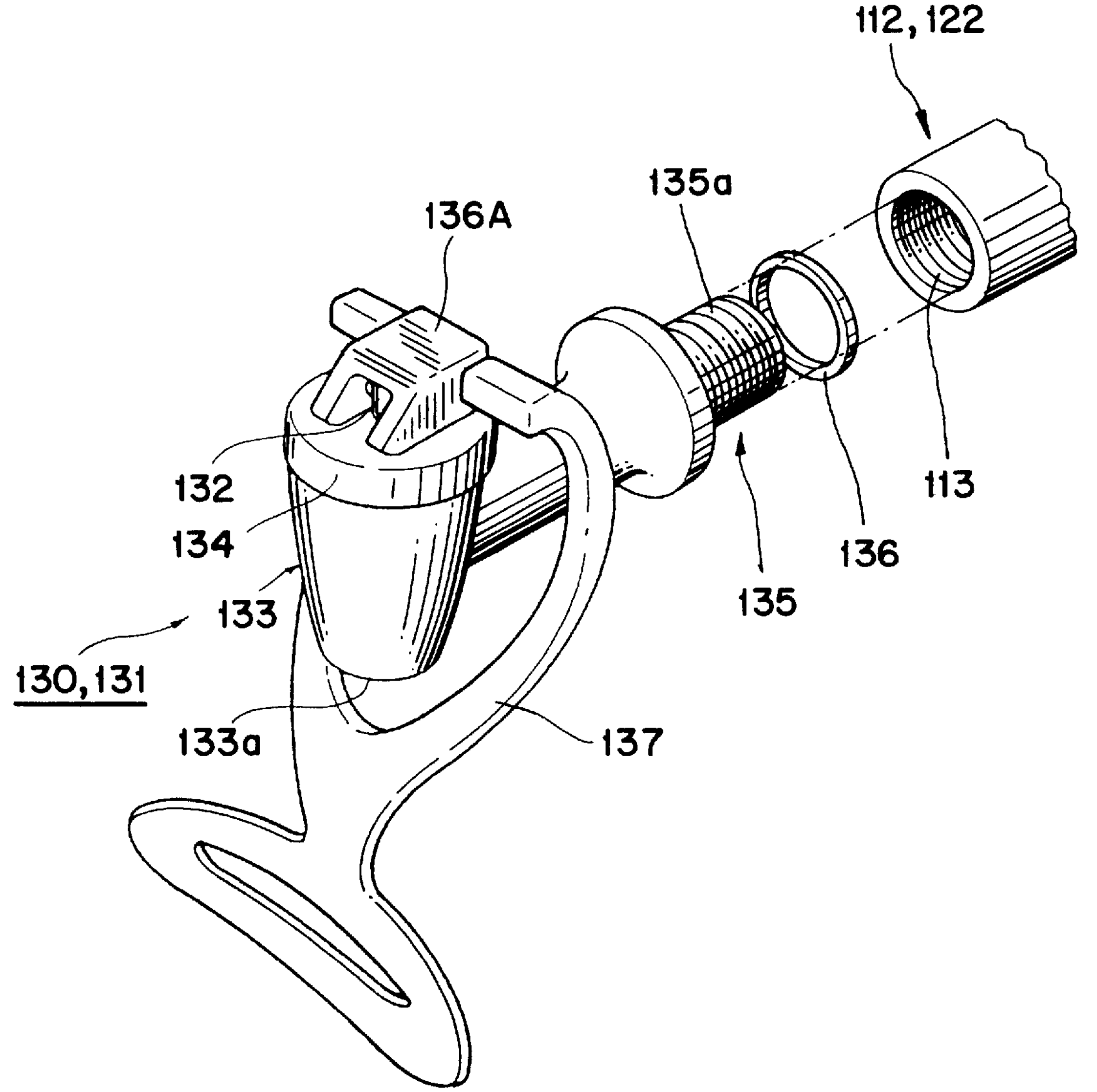
FIG. 5 (PRIOR ART)
FIG. 5 is an exploded perspective view of principal portions of a water dispensing valve and a water discharge pipe according to the prior art.
Figure 6:
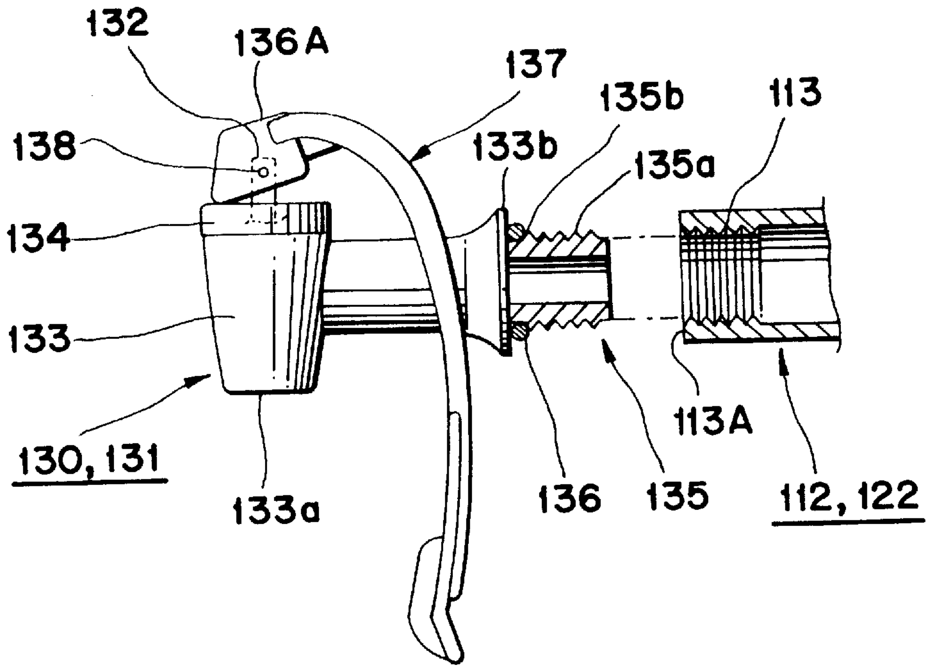
FIG. 6 (PRIOR ART)
FIG. 6 is a side view, partially sectioned for illustrating a connected relationship between a water dispensing valve and a water discharge pipe according to the prior art.
Figure 7:
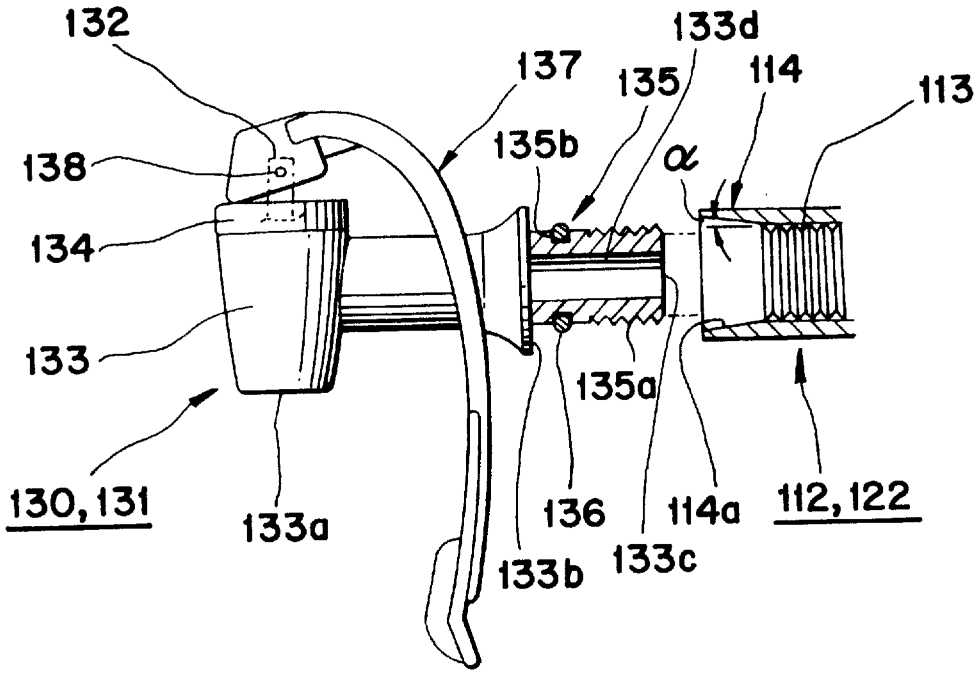
FIG. 7 is a side view, partially sectioned, for illustrating a connected relationship between a water dispensing valve and a water discharge pipe according to the present invention.
Figure 8:
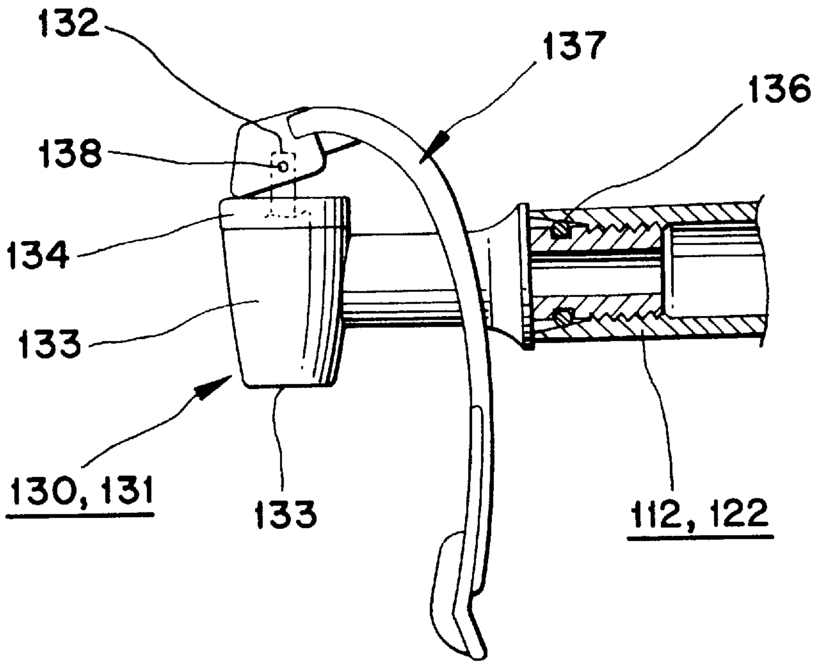
FIG. 8 is a side view, partially sectioned, for illustrating a coupled state between the water discharge valve and the water discharge pipe according to the present invention.

A water dispensing apparatus adapted to be used for the water dispensing coupling apparatus of a water purifier according to the embodiment of the present invention includes, as illustrated in FIGS. 7 and 8, a water dispensing body 133 inherently provided with a valve body 132 so as to discharge hot water or cold water. A water dispensing lid 134 is screwed onto an upper opening of the water dispensing body 133. A fastening unit 135 of the water dispensing body 133 is connected at one side thereof to a water discharge pipe 112 or 122 of the hot water and cold water storage tanks 110 and 120. A packing member 136 is adapted to be inserted into a groove 135*b* formed in a peripheral surface of the fastening unit 135 to prevent leakage of the cold water or the hot water. The groove 135 is spaced from a shoulder 133*b* of the body 133 and from a water inlet 133*c* of a water passage 133*d* extending through the body 133. A water dispensing lever 137 is hinged by a pin 138 to an upper end of the valve body 132 protruding upward from the water dispensing lid 134 to vertically operate the valve body 132 for opening or closing the water dispensing outlet 133*a* of the water dispensing body 133.

Each of the water discharge pipes 112 and 122 disposed at the water dispensing coupling apparatus of a water purifier according to the embodiment of the present invention is formed at an inner peripheral surface thereof with a female screw 113 which in turn meshes into a male screw 135*a* formed on the fastening unit 135 of the water dispensing valves 130 and 131.

Furthermore, the water discharge pipes 112 and 122 are formed with an airtight cover unit 114 having an axially inwardly tapered surface section 114*a* so that the inner diameter gradually enlarged from one end of the female screw 113 toward an external end of the water discharge pipes 112 and 122. The angle $\alpha$ formed between the tapered surface 114*a* and a line parallel to the pipe axis is less than 45°, as is evident from FIG. 7.

The fastening unit 135 is formed at one side thereof, as illustrated in FIG. 7, with the male screw 135*a* which is meshed into the female screw 113, and at the other side thereof with a groove 135*b* in which a packing member 136 is mounted.

Now, an operational effect of the water dispensing coupling apparatus of a water purifier according to the present invention thus constructed will be described.

The hot water and cold water dispensing valves 130 and 131 are connected to the water discharge pipes 112 and 122 disposed at the upper portion of the hot water storage tank 110 and the cold water storage tank 120.

In other words, when the water dispensing body 133 is rotated clockwise toward the water discharge pipe 112 or 122 in order to screw the fastening unit 135 the water discharge pipe 112 or 122, the packing member 136 inserted into the groove 135*b* of the fastening unit 135 is securely engaged with the inclined surface 114*a* of the water discharge pipe 112 or 122.

Furthermore, the water dispensing outlet 133*a* of the water dispensing body 133 is able to be positioned so as to face downward as illustrated in FIG. 8.

At this location, when the water dispensing outlet 133*a* is not pointing vertically downward in a state where the fastening unit 135 is securely fixed to the water discharge pipes 112 and 122, the packing member 136 is caused to stay at a predetermined spacing from one end of the fastening unit 135, as illustrated in FIG. 7, by which, an airtight sealing effect can be maintained while rotating the water dispensing body 133 reversely, i.e., counterclockwise to thereby cause the water dispensing outlet to be positioned vertically downward. That is, the packing member 136 remains in tight contact with the tapered surface 114*a* even when reversing the body 133.

As is apparent from the foregoing, there is an advantage in the water dispensing coupling apparatus of a water purifier according to the present invention, in that an airtight cover unit having an inclination at an inner peripheral surface of water discharge pipes for discharging hot and cold water so that an outer diameter can be enlarged toward an outer side thereof to thereby cause a packing member inserted into a groove of fastening unit to be secured thereto, whereby water discharge outlet of water dispensing body can be perpendicularly faced downward and the hot and cold water can be prevented from being leaked therefrom to thereby improve reliability and quality of the water purifier.

What is claimed is:

1. A water purifier, comprising:

a pair of storage tanks for storing hot and cold water, respectively;

a pair of water conduits each having first and second ends, the first end connected to a respective tank, an interior surface of each conduit having a female screw thread formed therein at a distance from the second end, a section of the interior surface disposed between the second end and the female screw thread being non-threaded and tapered such that a diameter thereof gradually increases from the female screw thread to the second end; and a pair of water dispensing bodies, each including:

a fastening portion having a male screw thread formed therein and threadedly connected to the female screw thread of a respective one of the conduits, a water passage extending through the body and including a water inlet and outlet, the inlet disposed at an end of the fastening portion;

a valve disposed in the water passage; and an annular groove formed in an outer surface of the fastening portion at a distance from the water inlet, whereby the male screw thread is situated between the water inlet and the groove, and a packing member seated in the groove and tightly engaging the tapered non-threaded section of the respective conduit to form a seal therewith.

2. The water purifier according to claim 1 wherein the outer surface of the fastening portion is cylindrical, the groove being circular.

3. The water purifier according to claim 1 wherein the tapered surface forms an angle less than 45° with a line parallel to an axis of the conduit.

4. The water purifier according to claim 1 wherein the body forms a radial shoulder where joined to the fastening portion, the groove being spaced from the shoulder.

* * * * *